Sept. 15, 1953
R. M. SCOTT
2,652,442
THERMOCOUPLE
Filed June 7, 1950
Fig. 1,
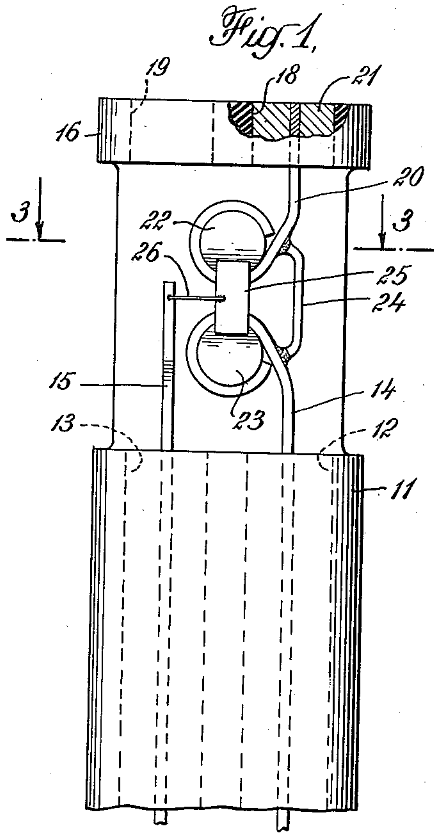
Fig. 2,
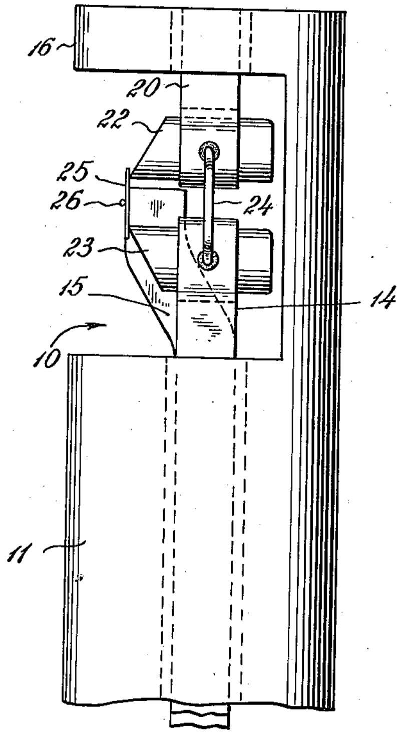
Fig. 4,
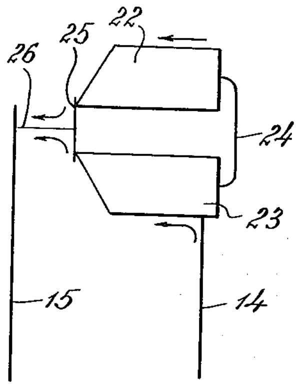
Fig. 3,
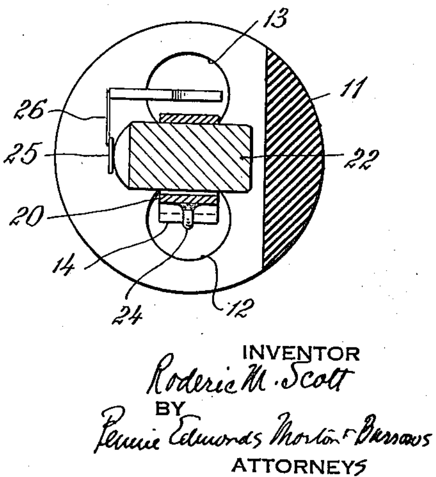
INVENTOR
Roderic M. Scott
BY
Pennie Edmonds Morton & Barrows
ATTORNEYS Patented Sept. 15, 1953

2,652,442

UNITED STATES PATENT OFFICE 2,652,442

THERMOCOUPLE

Roderic M. Scott, Stamford, Conn., assignor to The Perkin-Elmer Corporation, Glenbrook, Conn., a corporation of Connecticut Application June 7, 1950, Serial No. 166,658

7 Claims. (Cl. 136—4)

This invention relates to thermocouples for use in the detection of radiation, as in infrared spectrometers and like instruments, and is concerned more particularly with a novel thermocouple, which includes advantageous features of both the pin and wire types. The new thermocouple is superior to those heretofore available in that it has a better performance, may be made more rugged, and may be constructed to give a uniform response, regardless of what part of the receiver the radiation falls upon.

The prior pin type thermocouples have ordinarily consisted of a pair of pointed pins of different thermoelectric materials and a gold foil welded to the points of the pins and receiving the radiation. In such a thermocouple, the resistance of the complete couple depends upon the contact areas at the two welds and the resistivities of the two metals used for the pins. A small additional resistance is introduced by the foil but this is generally of the order of only a few percent of the total. When radiation falls upon the receiver, the temperature reached by the junctions is fixed by the thermal conductivities of the metals and of the contact areas of the welds. The output of the couple then depends on this temperature and the thermoelectric powers of the metals used for the pins, and the performance quality of the couple may be judged by the value of the ratio $S/R^{1/2}$, in which S is the output in volts per watt of radiant energy falling on the target and R is the resistance in ohms. In choosing the materials for the pins, it is desirable that the quantity $Q/(k\rho)^{1/2}$ for each metal be as large as possible, provided the couple is to be used as an unloaded source of E. M. F. In the expression stated, Q is the thermoelectric power of the material relative to gold expressed in volts per degree C., $k$ is the thermal conductivity in watts/cm.$^2$ at 0° C., and $\rho$ is the resistivity in ohms/cm. It is to be understood that the Q's of the two materials are of opposite sign, so that the generated voltages will add.

The foil receiver in a pin type thermocouple is mechanically supported by the welds and the welds must, therefore, be large enough in area to provide the necessary strength. At the same time, too low a resistance for the couple is inconvenient for electrical reasons. Also, for some applications, it is necessary that the response of the couple be independent of the portion of the target illuminated, and this requirement is fulfilled only if the ratio $Q/C$ is the same for both junctions, Q being defined as above and C being the thermal conductance of the welds.

It has been common practice heretofore to make one pin of a pin type thermocouple of a material selected from the group of semi-conductors consisting of tellurium, selenium, and their alloys. Such materials have low heat conductivity, fair electrical conductivity, and high thermoelectric power, and the value of the expression $Q/(k\rho)^{1/2}$ for such materials is relatively high. As the thermoelectric power of these materials is negative, it is necessary to make the second pin of a material of positive thermoelectric power and, for this purpose, certain other semi-conductors, such as silicon, germanium, and their alloys are used. Such semi-conductors have high thermoelectric power and intermediate conductivities, both thermal and electrical, and, as the value of $k$ for these materials is larger than the value of $k$ for the materials used for the first pin, the value of $Q/(k\rho)^{1/2}$ for the second pin is smaller than the value of that expression for the first pin. A consideration of the expression $Q/(k\rho)^{1/2}$ indicates that uniform sensitivity over the entire target surface can be obtained by making the size of the contact area of the foil to the second pin smaller than and in proper relationship to the size of the contact area of the foil to the first pin but, in practice, it has been found impossible to obtain uniform sensitivity in this way. One reason is that it is practically impossible to make the small weld of the proper area and, aside from that, the alloying effect resulting from welding the second pin to the foil produces variations in sensitivity, which cannot be controlled. The result is that, in a pin type thermocouple, in which one pin is of the tellurium group and the other pin a semi-conductor of opposite polarity, the end of the target near the first pin is much the more sensitive and, when one pin is a tellurium alloy and the other germanium, the tellurium end of the target may be as much as eight times more sensitive than the germanium end. A further objection to the use of a small contact area of the foil to the second pin is that the reduction in size of the area increases the electrical resistance and the performance of the couple is, accordingly, impaired.

The thermocouple of the invention includes two pins of the same material of high thermo-electric power with the junctions connected in parallel, a receiver of a foil of a metal of low thermoelectric power welded to the pointed end of the pin, and a conducting fibre attached to the foil. For many purposes, the fibre is of gold and without thermoelectric effect, but, when maximum sensitivity is required, the fibre is made of a thermoelectric material of a power opposite in sign to that of the pin material. The allow used for the pins in the new thermocouple is characterized by having a high value of the ratio $Q/(k\rho)^{1/2}$.

For a better understanding of the invention, reference may be made to the accompanying drawing, in which Figs. 1 and 2 are, respectively, front and side elevational views of one form of the new thermocouple and a mounting therefor;

Fig. 3 is a sectional view on the line 3—3 of Fig. 1; and

Fig. 4 is a wiring diagram of the thermocouple of Fig. 1.

The thermocouple is illustrated in the drawing as mounted in a chamber 10 formed by cutting away a part of an insulator 11, which is of rod form and preferably made of ceramic material. The insulator has a pair of passages 12, 13 extending through it and leading to chamber 10, and a conductor 14, which is of strap form and preferably made of silver, extends through passage 12 and terminates in a hook within the chamber. The space within passage 12 around the conductor is filled with an insulating compound, so that the conductor is firmly held in place. Another conductor 15 of strap form and preferably of silver extends through passage 13 into chamber 10 and is similarly held firmly in place by an insulating compound filling the space within the passage around the conductor.

The head 16 of the insulator above chamber 10 is formed with a pair of passages 18, 19 aligned with passages 12, 13, respectively, and a conductor 20, which is similar to conductors 14, 15, has an end entering passage 18 and held in place by a body 20 of insulating compound 21. In the construction disclosed, the passage 19 is not employed but, if desired, conductor 20 could be mounted in passage 19 rather than in passage 18.

The ends of conductors 14 and 20 within chamber 10 are bent to hook form and within the hooks are mounted pins or rods 22, 23 of the same material which is of high thermoelectric power. The hooks on conductors 14, 20 are so formed that, when the hooks are not under stress, the cross-sectional area of the space within the hooks is less than the cross-sectional area of pins 22, 23. It is, therefore, necessary to spring the hooks open slightly to insert the pins and, after the pins are in place and the hooks are released, the hooks grip the pins tightly and make good electrical connection therewith. Conductors 14 and 20 are connected by a conductor 24, which may be a piece of wire soldered or brazed to the conductors.

The radiation receiver of the thermocouple is a piece of foil 25, which is made of a metal of low thermoelectric power, such as gold, which is welded to the pins 22, 23 over small areas. Preferably, the pins are of circular section and have their ends facing out of the chamber cut off at an angle, so that their outer faces are somewhat oval in area. The foil 25 is then welded to the edges of the extreme outer ends of the pins, the welded areas being quite small. The thermocouple is completed by a connection between the foil and conductor 15 and, for this purpose, a fine metallic fiber 26 is secured to the foil and to the conductor. With the arrangement described, it will be apparent from the wiring diagram (Fig. 4) that the pins, which generate like voltages at the junctions with the foil, when the junctions are heated, are connected in parallel between conductors 14, 15.

The thermoelectric material used for the pins of the new thermocouple is preferably an alloy of tellurium with minor amounts of at least two of the metals bismuth, antimony, and selenium. The alloy contains at least 90% of tellurium and this constituent may run as high as 98%. The two other constituents of the alloy are present in effective amounts of at least 1%. A satisfactory alloy contains slightly less than 91% tellurium, about 8% selenium, and slightly more than 1% antimony. When the tellurium alloy described is used for the pins, the areas of the welds of the pins to the foil may be larger than those required when the pins are made of the semi-conductors, such as germanium, silicon, and their alloys.

In the new thermocouple, the sensitivity may be increased by making the fibre of a material having relatively high thermoelectric power, which is opposite in sign to the power of the thermoelectric material used for the pin or pins. The thermoelectric power of the tellurium alloy described is of the order of minus 400 microvolts per ° C. measured with respect to gold. Antimony has a thermoelectric power of plus 35 microvolts per degree with respect to gold, so that the use of this metal for the fibre increases the sensitivity of the thermocouple by an amount approaching 10%. Certain well-known bismuth alloys, such as one consisting of 95° bismuth and 5% tin, have thermoelectric powers of plus 50 to 100 microvolts per degree, so that the use of a fibre made of these alloys increases the sensitivity of the thermocouple up to 25%. Fine wires of antimony and the bismuth alloys mentioned are more difficult to handle than those of gold and the use of gold fibres is, accordingly, preferred in thermocouples which need not be of extreme sensitivity.

The point of attachment of the fibre to the receiver is a matter of convenience, except in cases where absolute uniformity of sensitivity over the entire surface of the receiver is required. If such uniformity is desired, the fibre is attached to the receiver exactly midway between its welds to the pins, but, if a variation of a few per cent in the response of the thermocouple, depending upon where the radiation falls on the receiver, is permissible, the fibre may be attached to any place on the foil that is convenient.

The material, of which the pins of the thermocouple are made, is characterized by a high value of the ratio $Q/(k\rho)^{1/2}$ and the area of each weld of the foil to a pin may be large. The thermocouple, accordingly, has a good performance and is not liable to be injured by shocks in use.

I claim:

1. A thermocouple which comprises a pair of elements made of substantially the same materials of high thermoelectric power, a foil of a material of low thermoelectric power joined to the elements over small areas, a conductor, on which one of the elements is mounted, a conductive mounting for the other element, a conductive connection between the elements remote from the foil, a second conductor, and a metallic fibre connected to the second conductor and to the foil.

2. A thermocouple which comprises a pair of thermoelectric elements, a foil of a material of low thermoelectric power joined to the elements over small areas, the elements being made of substantially the same materials of high thermoelectric power, a conductor, on which one of the elements is mounted, a conductive mounting for the other element, a conductive connection between the elements remote from the foil, a second conductor, and a metallic fibre connected to the second conductor and to the foil between its junctions to the elements.

3. A thermocouple which comprises a pair of pins made of substantially the same materials of high thermoelectric power, a foil of a material of low thermoelectric power joined to the pins over small areas, a conductor carrying one of the pins, a conductive connection between the pins remote from the junctions of the foil to the pins, a mounting for the second pin, a second conductor, and a metallic fibre connecting the second conductor and the foil.

4. In a thermocouple, the combination of a pair of thermoelectric elements of like materials of high thermoelectric power, a foil of a metal of low thermoelectric power welded to the elements over small areas thereof and acting as a radiation receiver, an electrical conductor connected to the elements at places remote from their welds to the foil, a lead connected to one element, and a thin electrically conductive fibre attached to the foil.

5. In a thermocouple, the combination of a pair of thermoelectric elements made of the same materials of high thermoelectric power, a thin foil of a metal of low thermoelectric power welded to the elements over small areas, a conductor connected to the elements at places remote from the welds, a thin electrically conductive fibre connected to the foil between its welds to the elements, and leads connected, respectively, to the conductor and fibre.

6. In a thermocouple, the combination of a pair of thermoelectric elements, each made of an alloy of high thermoelectric power and consisting of tellurium ranging from about 90% to about 98% and the remainder made up of effective amounts of at least two metals of the class consisting of bismuth, antimony, and selenium, a foil of a metal of low thermoelectric power welded to the elements over small areas thereof and acting as a radiation receiver, a lead connected to one element, a lead in the form of a fine metallic fibre connected to the foil, and an electrical connection between the elements at places remote from the welds.

7. In a thermocouple, the combination of a pair of pins made of the same material of high thermoelectric power, a thin foil of a metal of low thermoelectric power welded to the pins over small areas, a conductor connected to the pins at places remote from the welds, a fibre connected to the foil, the fibre being made of a thermoelectric material of high power opposite in sign to the power of the pin material, and leads connected, respectively, to the conductor and the fibre.

RODERIC M. SCOTT.

References Cited in the file of this patent

UNITED STATES PATENTS

| Number | Name | Date |
| --- | --- | --- |
| 2,233,788 | Lewin | Mar. 4, 1941 |
| 2,393,196 | Schwarz | Jan. 15, 1946 |
| 2,526,491 | Liston et al. | Oct. 17, 1950 |
| 2,526,492 | Liston et al. | Oct. 17, 1950 |

OTHER REFERENCES

Cartwright, "Review of Scientific Instruments," 1932, vol. 3, pp. 73–79.

Horning, "Review of Scientific Instruments," 1947, vol. 18, No. 7, pp. 474–482.